United States Patent [19]

Falcoff

[11] Patent Number: 4,702,931
[45] Date of Patent: Oct. 27, 1987

[54] PAINT SPRAY MACHINE HAVING WET FILM THICKNESS MEASUREMENT AND FEEDBACK CONTROL

[75] Inventor: Allan F. Falcoff, Lake Orion, Mich.

[73] Assignee: E. I. Du Pont de Nemours and Company, Wilmington, Del.

[21] Appl. No.: 925,383

[22] Filed: Oct. 31, 1986

[51] Int. Cl.[4] .................... B05C 11/00; A01G 27/00; B67D 5/08
[52] U.S. Cl. ...................................... 427/10; 118/697; 118/698; 118/712; 239/69; 239/71
[58] Field of Search ............... 118/697, 698, 702, 300; 239/69, 71, 302; 427/9, 10

[56] References Cited
U.S. PATENT DOCUMENTS

| | | | |
|---|---|---|---|
| 4,278,046 | 7/1981 | Clarke et al. | 118/697 X |
| 4,614,300 | 9/1986 | Falcoff | 118/697 X |

*Primary Examiner*—Michael R. Lusignan
*Attorney, Agent, or Firm*—Hilmar L. Fricke

[57] ABSTRACT

An improved paint spraying device for applying coats of paint to an object in which the machine has a paint spray gun, a gear pump gun that pumps paint to the spray gun from a vessel containing paint, a variable speed electric motor that drives the gear pump, a pump motor controller that controls the electric motor of the gear pump, means for moving the spray gun vertically and horizontally and for controlling the speed and acceleration of the movement of the gun, means for controlling the number of passes made by the gun, the dwell period at the end of each pass and the flash time between coats of paint applied by the gun; wherein the improvement is as follows:

a. a wet film measuring device which makes a measurement of paint film thickness of the paint applied to the surface of the object without contacting the object at a multiplicity of predetermined points over the entire painted surface of the object and generates an electrical signal for each film thickness measurement that is proportional to the film thickness and correlates the measurement to point at which the measurement was made;

b. a computer which receives the signal from the measuring device and calculates increase or decrease in amount of paint to be applied to the next object being sprayed at each point the film thickness was measured and converts to a signal that is fed to the pump motor controller that controls paint being fed to the spray gun.

6 Claims, 5 Drawing Figures

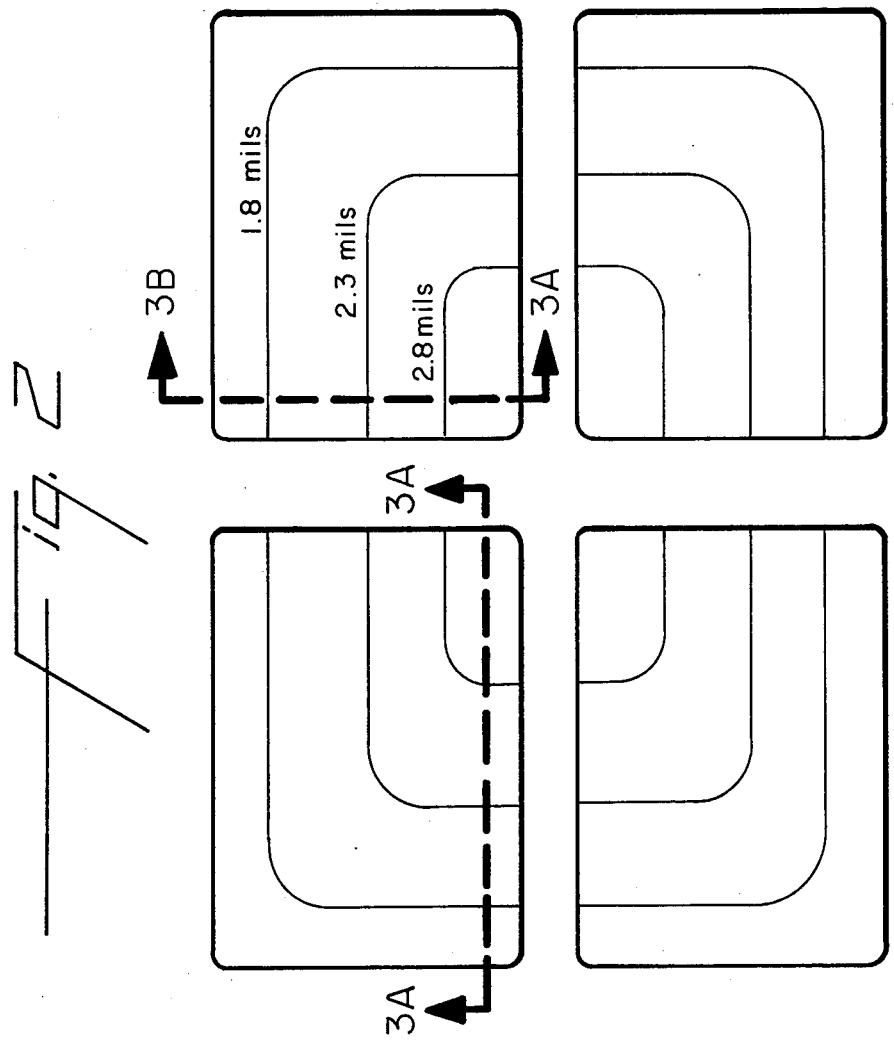

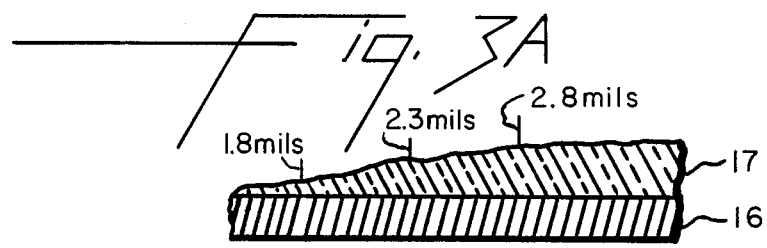
Fig. 3A
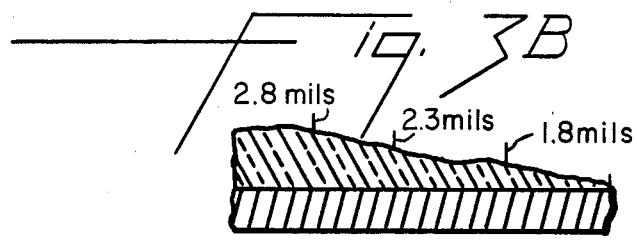
Fig. 3B
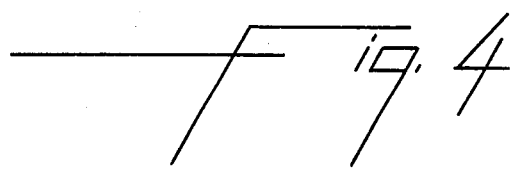
Fig. 4
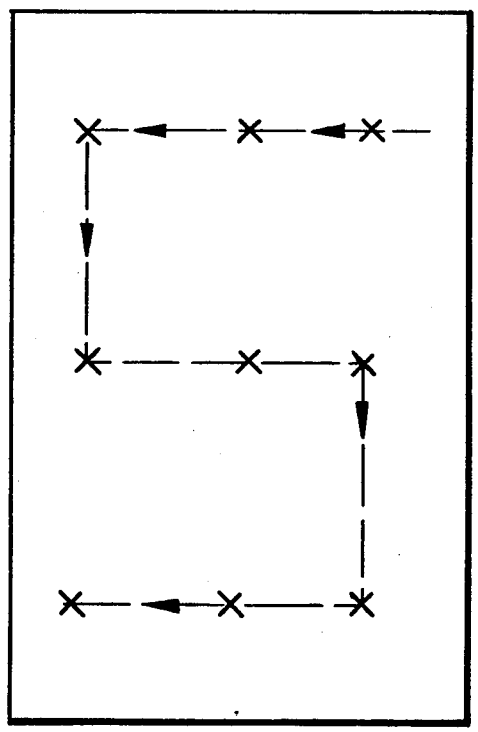

PAINT SPRAY MACHINE HAVING WET FILM THICKNESS MEASUREMENT AND FEEDBACK CONTROL

BACKGROUND OF THE INVENTION

This invention relates to an improved spray machine and in particular to a spray machine that measures the thickness of a wet paint film on an article being sprayed and also controls the thickness of the paint film.

An example of a modern high quality spray machine is shown in Falcoff U.S. Pat. No. 4,614,300 issued Sept. 30, 1986. Many spray parameters are set and automatically controlled by this machine except paint film thickness.

In the spray application of many paints, a relatively thin film is formed near the edge of the article being coated and is substantially thicker in the center of the article. This difference in thickness of the paint film results in an appearance changes from the center to the edge of the article. This is a problem in the coating of articles such as auto or truck body panels in which a uniform appearance is desired and in particular is a problem for paint panels which are used as color standards in laboratories, paint manufacturing plants and automotive and truck assembly plants. In particular, rejects of paint panels to be used for color standards can be as high as 50% of the panels coated for such uses. There is a need for a spray machine and process that will uniformly apply paint to substrates and is able to monitor and correct paint flow which directly affects film thickness on the article being sprayed.

SUMMARY OF THE INVENTION

An improved paint spraying machine for applying coats of paint to an object in which the machine has a paint spray gun with an adjustable spray nozzle, a gear pump tubularly connected to the spray gun that pumps paint to the spray gun, a vessel containing paint tubularly connected to the spray gun, a variable speed electric motor that drives the gear pump, a pump motor controller that controls the electric motor of the gear pump, means for moving the spray gun vertically and horizontally and for controlling the speed and acceleration of the movement of the gun, means for controlling the number of passes made by the gun, means for controlling the dwell period at the end of each pass and means for controlling the flash time between coats of paint applied by the gun; wherein the improvement comprises the following:
  a. a wet film measuring device which makes a measurement of paint film thickness of the paint applied to the surface of the object without contacting the object at a multiplicity of predetermined points over the entire painted surface of the object and generates an electrical signal for each film thickness measurement that is proportional to the film thickness and correlates the measurement to point at which the measurement was made;
  b. a computer which receives the signal from the measuring device and calculates an increase or decrease in amount of paint to be applied to the next object being sprayed at each point the film thickness was measured and converts to a signal that is fed to the pump motor controller which in turn controls the motor driving the gear pump feeding paint to the spray gun which allows the spray gun to apply a uniformly thick paint film to the object.

BRIEF DESCRIPTION OF THE DRAWING

FIG. 2 shows the paint film thickness of four panels topographically.

FIG. 3 shows a cross section at A—A and at B—B of the panels of FIG. 2.

FIG. 4 shows a typical sequence of film thickness measurement of a coated panel.

DETAILED DESCRIPTION OF THE INVENTION

Figure 1:
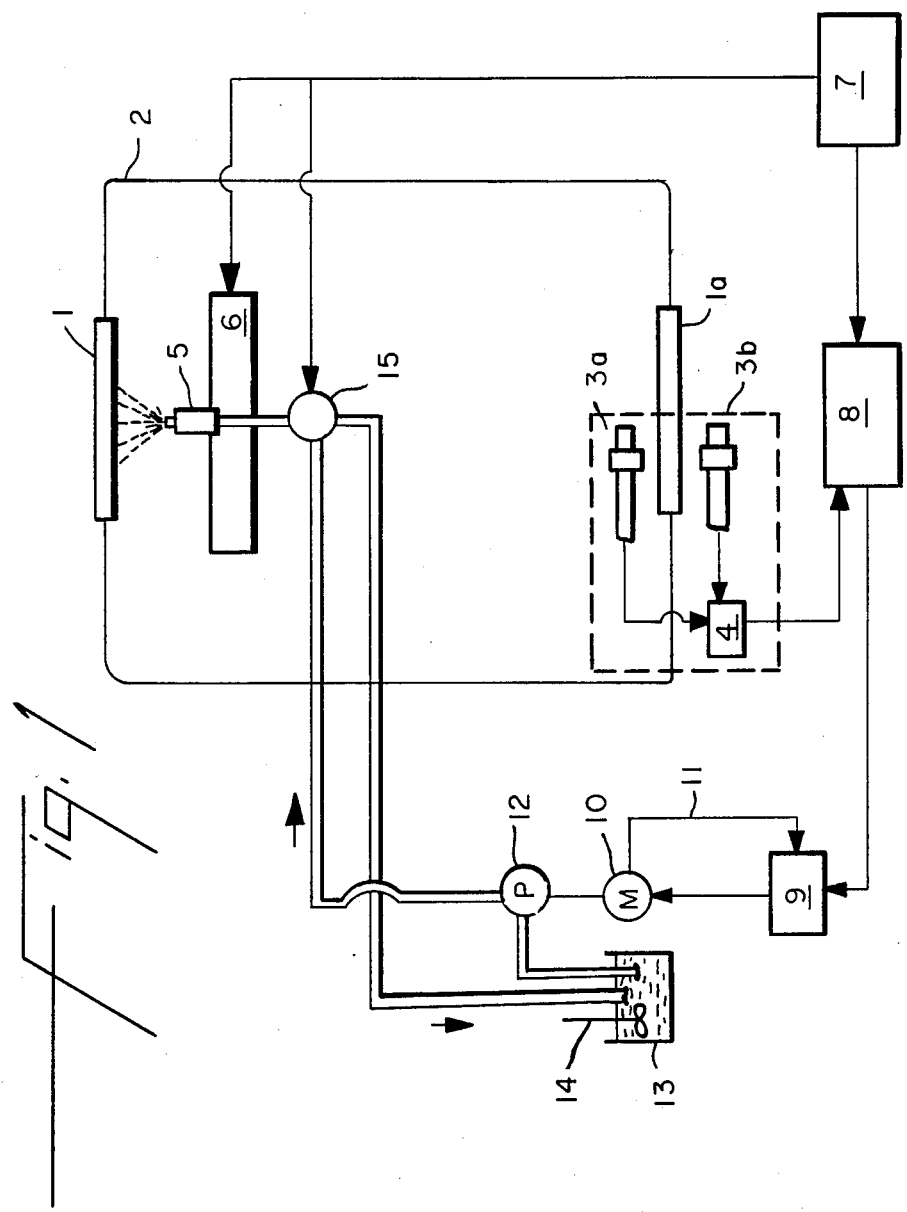
FIG. 1 is a schematic representation illustrating the major components of the spray machine of this invention.

FIG. 2 shows a topographical contour of four panels that have been placed on a holder and sprayed with a spray machine shown in the aforementioned U.S. Pat. No. 4,614,300. The film thickness contour lines show that the paint film is significantly thinner at the outer edge of the four panels and the film thickness increased toward the center of the four panels. The outer edges show a film thickness contour of 1.8 mil which increases to 2.3 mil and to 2.8 mils in the center of the four panels.

FIG. 3 shows the cross section A—A of the upper left hand panel of FIG. 2. The metal or plastic substrate 16 is coated with paint film 17. The paint film has a thickness near the edge of 1.8 mils and increases to 2.8 mils which is the center of the four panels that were sprayed. If the four panels were one solid panel, and sprayed as shown, the outer edges would have a thin film of paint and the center would be substantially thicker. Cross section B—B of the upper right hand panel of FIG. 2, essentially shows the same as above. The paint film 17 on substrate 16 is thinner at the outer edge than toward the center.

An objective of this invention is to provide a uniformly thick paint film over the entire surface being painted and thereby provide a uniform appearance which cannot be obtained with painted substrates sprayed with conventional spray equipment. This objective can be accomplished by continuously adjusting the amount of paint being applied by the spray gun. To ascertain the amount of paint to be applied, the wet paint film thickness must be measured over the entire surface of the substrate that has been painted. Based on such thickness measurements, adjustments can be made to the amount of paint being applied to any portion of the substrate.

FIG. 1 shows a schematic diagram of the major components of the improved spray machine of this invention. A panel 1, preferably four panels as shown in FIG. 2, mounted on a chain driven conveyor 2 is sprayed by spray gun 5 with a coating of paint. The spray gun 5, typically, a Devilbiss AGB541 spray gun, is driven by a spray robot 6 which is controlled by computer 7. U.S. Pat. No. 4,614,300, which is hereby incorporated by reference, shows a typical computer controlled spray machine that can be used. The robot 6, controlled by the computer, moves the gun vertically and horizontally over the object being coated. Speed and acceleration of the gun, dwell time at the end of a pass and flash time between coats of paint all are controlled by the computer controlled robot.

After a coating of paint has been applied to the panel, it is rotated into a position to allow a wet film measuring device, shown as 3a and 3b, to measure film thickness. The panel in this position is identified as 1a.

The wet film thickness measuring device, shown within the dash lines of FIG. 1, typically a Ultrasonic Array TMS-1000, is comprised of two ultrasonic transducers illustrated as 3a and 3b and an Ultrasonic Controller 4. The distance from each transducer to the panel is measured and paint film thickness is calculated. By subtracting the known panel thickness, paint film thickness then is determined. The Ultrasonic Controller 4 makes these determinations.

The above can be illustrated as follows:
$d_o$ = total distance between the transducers 3a and 3b. (predetermined and stored in the Ultrasonic controller)
$d_a$ = distance from transducer 3a to panel. (automatically measured)
$d_b$ = distance from transducer 3b to panel. (automatically measured)
Thickness of panel and paint film = $d_o - (d_a + d_b)$
To determine the thickness of the paint film, the thickness of the panel is subtracted.

It is possible to use a noncontact single side film thickness measurement device for determining wet paint film thickness. For painting parts of various shapes and contours, a single side film thickness measuring device is desired.

Paint film thickness measurements are made on at least nine places on a typical paint panel as shown in FIG. 4. Each of these values along with the horizontal and vertical position on the panel of the measurement are fed to the Ultrasonic Controller 4 which in turn feeds a signal to the microcomputer 8, typically, an Intel SBC 8010B Microcomputer. National Semiconductor BLC 8014 Microcomputer and an Intel SBC8020 Microcomputer can also be used.

For the next panel or group of panels to be sprayed, the microcomputer determines the amount of paint required for each position in which a film thickness measurement was taken to have a uniformly thick paint film on the panel and correlates this information with spray gun position information received from computer 7. The above information is fed to the pump motor speed controller 9 which controls the electric motor 10 that drives the gear pump 12.

The motor speed pump controller 9 is electrically connected to the pump motor 10 and sets the speed of the motor through a digital closed circuit feed back loop 11 and adjusts the speed of the motor which is directly correlated to the amount of paint required on the panel being sprayed at any given point. Typically, a Zenith TYPE QM - 1412 motor speed controller is used. The motor 10 used to drive the gear pump 12 typically is a D.C. motor of ½ HP (horsepower) with a variable speed of 90–1800 rpm. D.C. motors of ¼–1 HP can be used with appropriate changes in the gearing to drive the pump.

The gear pump 12 pumps paint from vessel 13, having a mechanical agitator 14, via a valve 15 to the spray gun 5. Valve 15 is a two position valve controlled by the computer 7 which in one position allows paint to flow to the spray gun and in the second position recycles paint back to the vessel when the spray gun is not being used.

Preferably, the valve 15 is a two position ball valve and has a valve operator which is an air operated double action piston driven by compressed air. Preferably, the ball valve and the double action piston valve are coupled together in one unit. A typical unit, made by Whitey Company, Highland Heights, Ohio, is a MS-153DA 180° Double Action Valve No. SS-45XS8-153DA-LSK-153.

The gear pump 12, typically a Zenith pump, made by Zenith Products Company is a precision rotary gear metering pump that provides an accurate flow rate of paint of about 300–700 cc/minute. Zenith pumps which pump at a flow rate of about 0.16–50 cc/revolution can be used. These pumps are equipped with a reducing gear assembly to provide a fixed gear ratio to drive the pump with the variable speed motor. A magnetic pickup monitoring gear can be used to provide a digital pulse feed back to the motor speed controller 9.

EXAMPLE

Four panels, 24×19 inches, were mounted in the spray machine shown in FIG. 1 and sprayed with a black acrylic lacquer without controlling paint film thickness by changing output of the pump. The wet film thickness of each panel was measured at three different horizontal and vertical points across the panel as shown in FIG. 4. The film thickness values are shown in the table below:

TABLE 1

| WET FILM THICKNESS VALUES (MILS) UNCONTROLLED SPRAY | | | | | |
|---|---|---|---|---|---|
| Panel 1 | | | Panel 2 | | |
| 3.7 | 3.7 | 3.7 | 3.6 | 3.3 | 2.5 |
| 3.1 | 3.8 | 3.9 | 3.8 | 3.5 | 3.4 |
| 3.3 | 3.9 | 3.7 | 3.9 | 3.4 | 2.7 |
| Panel 3 | | | Panel 4 | | |
| 3.1 | 3.8 | 3.5 | 4.2 | 3.7 | 3.0 |
| 3.3 | 3.8 | 3.9 | 3.7 | 3.4 | 3.4 |
| 3.0 | 3.1 | 3.3 | 3.0 | 3.1 | 2.7 |

The coefficient of variation was calculated.

$$\text{Coefficient of Variation } CV = \frac{\sigma}{\overline{X}} \times 100$$

where
$\overline{X}$ = mean of values = 3.4
$\sigma$ = standard deviation = 0.43
CV = 12.65%

A second set of panels was sprayed as above except film thickness information of a previously sprayed set of panels was fed to the microcomputer 8 and adjustments were made as this second set of panels was sprayed. The wet film thickness was measured as above and the results are shown in the table below:

TABLE 2

| WET FILM THICKNESS VALUES (MILS) CONTROLLED SPRAY | | | | | |
|---|---|---|---|---|---|
| Panel 1 | | | Panel 2 | | |
| 2.54 | 2.71 | 2.59 | 2.70 | 2.51 | 2.05 |
| 2.45 | 2.73 | 2.60 | 2.71 | 2.68 | 2.31 |
| 2.52 | 2.54 | 2.42 | 2.55 | 2.54 | 2.16 |
| Panel 3 | | | Panel 4 | | |
| 2.57 | 2.62 | 2.45 | 2.57 | 2.56 | 2.34 |
| 2.57 | 2.77 | 2.59 | 2.62 | 2.64 | 2.35 |
| 2.56 | 2.76 | 2.57 | 2.55 | 2.55 | 2.17 |
| $\overline{X}$ = 2.53 | | | | | |
| $\sigma$ = 0.17 | | | | | |
| CV = 6.7% | | | | | |

By adjusting and controlling the paint feed according to the process of this invention and using the improved spray machine of this invention the coefficient of variation of paint film thickness was reduced by about 50%.

I claim:

1. An improved paint spraying machine for applying coats of paint to an object in which the machine has a paint spray gun with an adjustable spray nozzle, a gear pump tubularly connected to the spray gun that pumps paint to the spray gun, a vessel containing paint tubularly connected to the spray gun, a variable speed electric motor that drives the gear pump, a pump motor controller that controls the electric motor of the gear pump, means for moving the spray gun vertically and horizontally and for controlling the speed and acceleration of the movement of the gun, means for controlling the number of passes made by the gun, means for controlling the dwell period at the end of each pass and means for controlling the flash time between coats of paint applied by the gun; wherein the improvement used therewith comprises a. a wet film measuring device which makes a measurement of paint film thickness of the paint applied to the surface of the object without contacting the object at a multiplicity of predetermined points over the entire painted surface of the object and generates an electrical signal for each film thickness measurement that is proportional to the film thickness and correlates the measurement to point at which the measurement was made;

b. a computer which receives the signal from the measuring device and calculates increase or decrease in amount of paint to be applied to the next object being sprayed at each point the film thickness was measured and converts to a signal that is fed to the pump motor controller which in turn controls the motor driving the gear pump feeding paint to the spray gun which allows the spray gun to apply a uniformly thick paint film to the object.

2. The spray machine of claim 1 in which the wet film measuring device comprises two transducers positioned on either side of the painted object to measure film thickness.

3. The spray machine of claim 2 in which the transducers are ultrasonic transducers.

4. The spray machine of claim 1 in which the pump motor controller is a digital controller with a closed feed back loop.

5. The spray machine of claim 1 in which a two position rotatable ball valve is positioned between the vessel containing paint and the spray gun wherein the first position of the ball valve allows paint to flow from the vessel to the spray and in the second position allows paint to recycle to the vessel.

6. An improved paint spraying method for applying coats of paint to an object using a spray machine with a paint spray gun having an adjustable spray nozzle, a gear pump tubularly connected to the spray gun that pumps paint to the spray gun, a vessel containing paint tubularly connected to the spray gun, a variable speed electric motor that drives the gear pump, a pump motor controller that controls the electric motor of the gear pump, means for moving the spray gun vertically and horizontally and for controlling the speed and acceleration of the movement of the gun, means for controlling the number of passes made by the gun, means for controlling the dwell period at the end of each pass and means for controlling the flash time between coats of paint applied by the gun; wherein the improvement used therewith comprises a. measuring the wet paint film thickness with a wet film measuring device of the paint applied to the surface of the object without contacting the object at a multiplicity of predetermined points over the entire painted surface of the object and generating an electrical signal by the device for each film thickness measurement wherein the signal is proportional to the film thickness and correlating the measurement to point at which the measurement was made;

b. calculating the increase or decrease through a computer that received the signal from the measuring device of the amount of paint to be applied to the next object being sprayed at each point the film thickness was measured and converting via the computer to a signal and feeding the signal to the pump motor controller which controls the motor driving the gear pump feeding paint to the spray gun whereby the spray gun applies a uniformly thick paint film to the object.

* * * * *